United States Patent [19]

Sakamoto

[11] 4,368,488
[45] Jan. 11, 1983

[54] PICTURE SCANNING METHOD AT HIGH SPEED

[75] Inventor: Takashi Sakamoto, Kyoto, Japan

[73] Assignee: Dainippon Screen Seizo Kabushiki Kaisha, Kyoto, Japan

[21] Appl. No.: 208,636

[22] Filed: Nov. 20, 1980

[30] Foreign Application Priority Data

Nov. 26, 1979 [JP] Japan ............................. 54-152826

[51] Int. Cl.³ .............................................. H04H 3/08
[52] U.S. Cl. .................................. 358/208; 358/285; 358/293; 350/6.8
[58] Field of Search ............... 358/208, 225, 214, 285, 358/292, 293; 350/6.5, 6.6, 6.9, 6.91, 6.8, 484, 486, 487

[56] References Cited

U.S. PATENT DOCUMENTS 3,520,586  7/1970  Bousky ............................. 358/206

Primary Examiner—Robert L. Griffin
Assistant Examiner—Edward L. Coles
Attorney, Agent, or Firm—Lackenbach, Siegel, Marzullo, Presta & Aronson

[57] ABSTRACT

A method for scanning an original picture at a high speed by using a white light for use in a picture reproducing machine such as a color scanner and a color facsimile, wherein a light beam generated by a light source is deflected by a light deflector and the deflected light beam is focused by a concave mirror, and wherein an original picture is scanned by a light spot obtained by focusing the light beam by the concave mirror, while the light deflector is oscillated, the original picture being arranged in a curve along which the light spot is focused, and then the light beam passing through the original picture is detected by a light detector to obtain a picture signal.

14 Claims, 9 Drawing Figures

PICTURE SCANNING METHOD AT HIGH SPEED

BACKGROUND OF THE INVENTION

This invention relates to a method for scanning an original picture by light beam at a high speed in a picture reproducing machine.

In a conventional method, an original picture through which the light beam is passed, is mounted to a transparent glass or plastic cylinder, and a light source and a pickup means are arranged inside and outside the cylinder, respectively. During the rotation of the cylinder, picture signals are consecutively picked up from the original picture by the pickup means. This method is carried out in a color scanner for photographic plate-making or a facsimile.

In this method, however, when the cylinder is rotated at high speed, the original picture is often detached or floated off the cylinder by the centrifugal force, and thus the pickup of the picture signals becomes incorrect. Hence, the rotation speed of the cylinder is restricted, and thus the operation speed of the machine is restricted, which means the difficulty of raising the operational speed.

In order to overcome this disadvantage, a plane light scanning method has been developed. In this method, the original picture mounted to the flat plane is scanned along a straight line by means of a light spot condensed by a combination of a light deflector such as a galvanometric mirror and a rotary polygonal mirror, and an optical system for focusing a picture image while the light beam reflected from or passed through the light spot is picked up by a photoelectric element of the pickup means.

In this method, however, when the light beam is separated into color separated light beams for primary colors, in order to receive each of the color separated light beams by means of each photoelectric element, a complicated optical system is required, and in particular, it is difficult to obtain an unsharp signal. Further, the accuracy of the picture image, or the size of the picture element depends on the diameter of the light spot focused, but, in this case, it is difficult to obtain an equal diameter of the light beam through the entire scanning line.

In order to prevent the picture image from being distorted, a f·θ lens which moves the scanning light spot in proportion to the deflection angle of the deflector, has been used for the light scanning. Now, only the f·θ lens having a narrow range of deflection angles and a large diameter of the scanning light spot, is realized. Further, in such a f·θ lens a single color light should be used. Accordingly, it is quite difficult to design a f·θ lens which is capable of obtaining an equal light spot by using the white light which is to be separated into the primary colors for the photographic plate-making.

When red, blue and green single color lights are used instead of the white light for the color separation scanning operation, the construction of the optical system becomes very complicated, and if laser tubes are used for generating the scanning lights, it requires quite high cost, which is uneconomical. Further, in order to compensate the inpurity component of the coloring material of the color film, a masking signal should be input depending on the kind of the color film, and since the compensation value depends on the kind of the color film, a complicated input signal is required. Thus, in practice, this method is almost impossible to be realized.

SUMMARY OF THE INVENTION

Therefore, it is an object of the present invention to provide a method for scanning an opriginal picture by light beam at a high speed in a picture reproducing machine, free from the above described defects, which is stable and reliable, and which is carried out by using the white light.

According to the present invention there is provided a method for scanning an original picture by light beam at a high speed for use in a picture reproducing machine, comprising the steps of (a) deflecting a light beam which is generated by a light source, by a light deflector which is pivotally oscillated, (b) focusing the deflected light beam by a concave mirror, (c) scanning an original picture by a light spot obtained by focusing the light beam by the concave mirror, while the light deflector is oscillated, the original picture being arranged in a curved plane including a curve along which the light spot is focused, and (d) detecting the light beam passing through the original picture by a light detector to obtain a picture signal.

BRIEF DESCRIPTION OF DRAWINGS

In order that the present invention may be better understood, preferred embodiments thereof will be described with reference to the accompanying drawings, in which.

DESCRIPTION OF PREFERRED EMBODIMENTS

Figure 1:
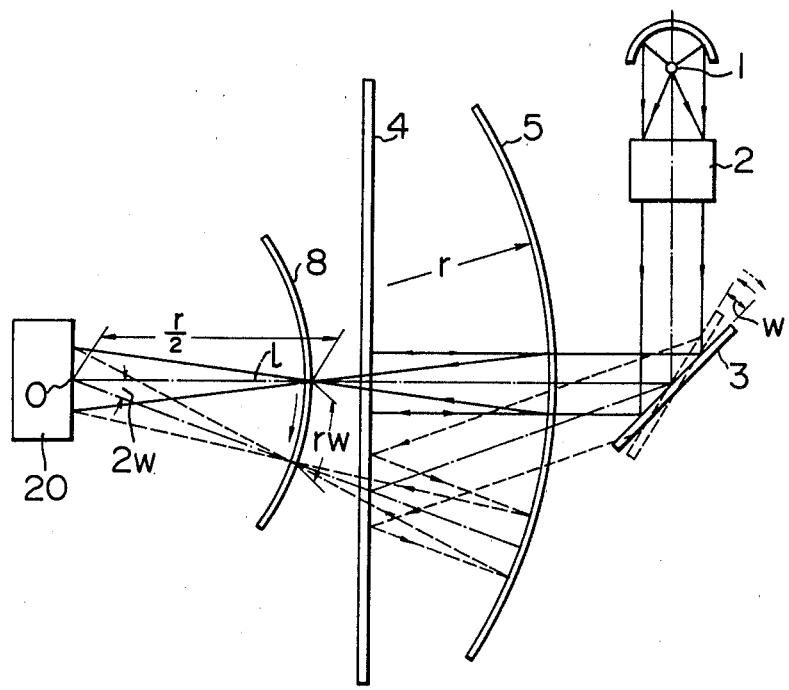
FIG. 1 is a top plan view of an optical system for performing one embodiment of a method according to the present invention for showing a principle thereof.
Figure 2:
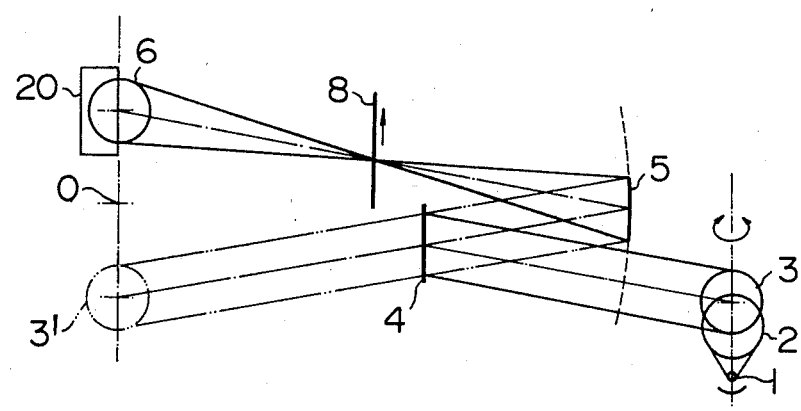
FIG. 2 is an elevation view of FIG. 1.

Referring now to the drawings there is shown in FIGS. 1 and 2 an optical system for performing one embodiment of a method according to the present invention for explaining thereof.

In FIGS. 1 and 2 a vertical pivot axis of an illumination deflector mirror 3 which is adapted to pivot around the pivot axis, and a vertical plane in which a photoelectric light detector 20 is placed, are positioned in symmetrical positions with respect to a vertical planar mirror 4. The center 0 of a diameter r of a spherical concave mirror 5 is positioned on a vertical axis on which the center of the photoelectric light detector 20 is positioned.

As shown in FIG. 2, the illumination deflector mirror 3, the planar mirror 4, the spherical concave mirror 5, and the light detector 20 are arranged in different heights. The light detector 20 is positioned in an upper symmetrical position of a virtual image position 3' of the deflector mirror 3 with respect to the planar mirror 4, with respect to the diameter center 0 of the spherical mirror 5.

A light beam generated by a light source 1 is allowed to be parallel by a collimator 2, and then is reflected to the planar mirror 4 by the illumination deflector mirror 3 via a space under the spherical concave mirror 5. The light beam reflected by the mirror 4 is then reflected by the spherical mirror 5 and is passed through a space above the mirror 4, resulting in focusing at a point where an original picture 8 is arranged and which is positioned at a distance r/2 away from the center 0 of the diameter r of the spherical mirror 5. Then, the light beam diverged through the original picture 8 is reached the photoelectric light detector 20 which outputs a picture signal depending on the light beam received.

In this case, while the illumination deflector mirror 3 is pivoted, the light beam reflected by the spherical mirror 5 is always directed to the light detector 20, and the diverged light beam incident to the light detector 20 has the same width as one reflected by the deflector mirror 3.

When the illumination deflector mirror 3 is pivoted through an angle w, the light spot focused by the spherical mirror 5 is moved from the center line 1 which passes through the centers of the spherical mirror 5 and the light detector 20, in a distance rw (equals $\frac{1}{2}r \times 2w$) along a horizontal spherical curve positioned at the distance r/2 away from the center 0 of the spherical mirror 5, as shown in FIG. 1.

Consequently, when the illumination deflector mirror 3 is pivotally oscillated at a certain angular speed, the focused light spot is moved at a fixed speed along the spherical curve which is positioned at the distance r/2 away from the center 0 of the spherical mirror 5. Hence, if the original picture 8 is arranged in a plane including the spherical curve which is positioned at the distance r/2 away from the center 0, the original picture 8 may be scanned by the focused light spot. Further, if the original picture 8 is moved in the vertical direction, as indicated by an arrow shown in FIG. 2, the entire surface of the original picture 8 may be scanned continuously by the focused light spot.

Figure 3:
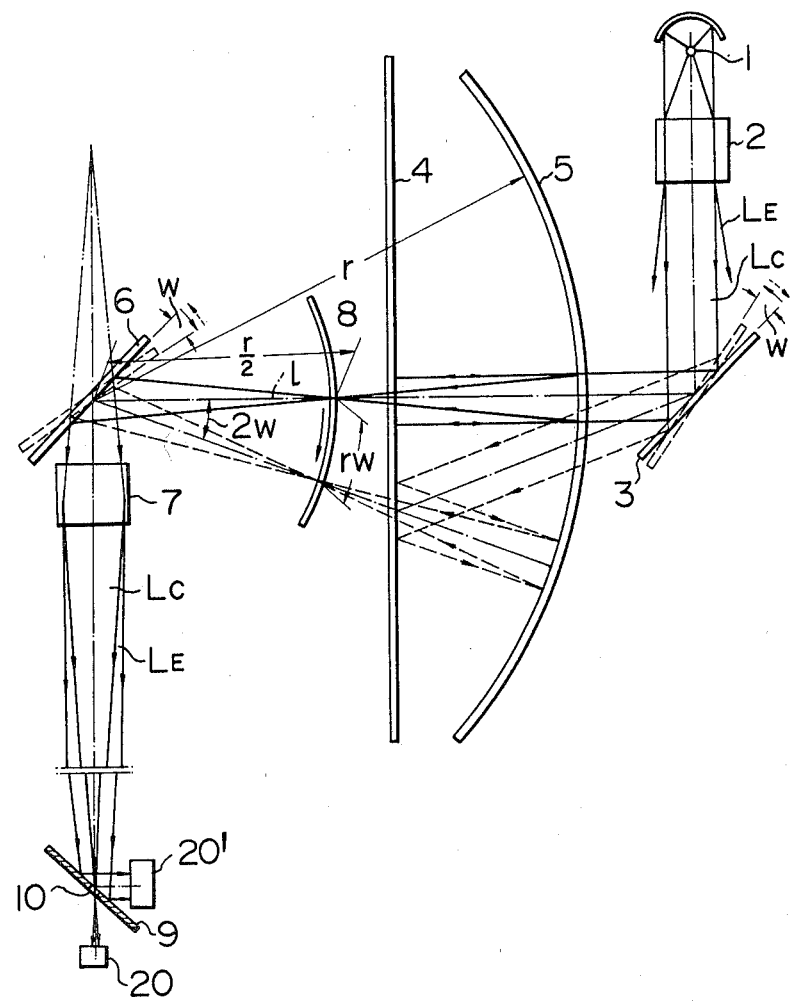
FIG. 3 is a top plan view of another embodiment of a method according to the present invention, wherein a pickup deflector mirror and a pickup lens are used.
Figure 4:
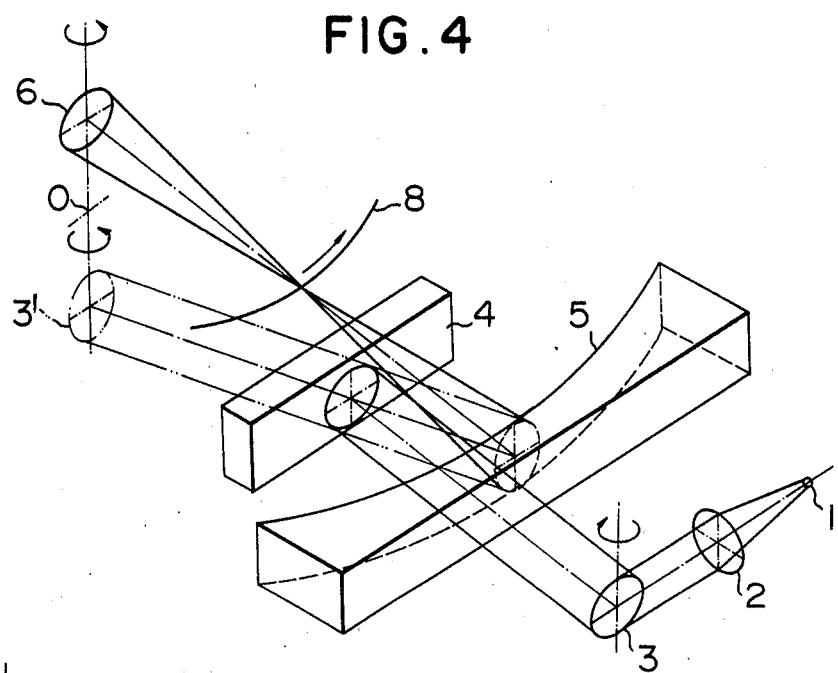
FIG. 4 is a perspective view of FIG. 3.

In FIGS. 3 and 4, there is shown another embodiment of the present invention, which is the same as the first embodiment shown in FIGS. 1 and 2, except that a pickup deflector mirror 6 is arranged in the position where the light detector 20 of FIG. 1 is placed, that a pickup lens 7 focused the light beam reflected by the pickup deflector mirror 6, that an aperture mirror 9 having an aperture 10 in its center reflects the light beam which is focused in the center of the aperture mirror 9, and that photoelectric light detectors 20 and 20' receive the light beam through the aperture 10 and the light reflected by the aperture mirror 9. In this case, the pickup deflector mirror 6, the pickup lens 7, the aperture mirror 9 and the light detector 20 are aligned along a horizontal light axis.

In this embodiment, the pickup deflector mirror 6 is pivotally oscillated in synchronization with the illumination deflector mirror 3 so that the light beam reflected by the pickup deflector mirror 6 may always be incident to the pickup lens 7 fixed along the light axis thereof.

The light beam which is focused in and passed through the aperture 10 of the aperture mirror 9, that is, the parallel light beam $L_C$ through the collimator 2 is received by the light detector 20 as to be a sharp signal, and the light beam $L_E$ around the light beam $L_C$ through the collimator 2 is reflected by the aperture mirror 9 and is received by the light detector 20' as to be an unsharp signal. Thus the obtained sharp and unsharp signals are combined and utilized as a detail emphasis signal in a conventional manner. In this case, the size of the light detectors 20 and 20' may be reduced as compared with that of the embodiment shown in FIGS. 1 and 2.

As apparent from the above description, the size of the minimum pickup unit element depends on the magnification of the pickup lens 7 and the size of the aperture 10, but it does not depend on the size of the light spot focused on the original picture 8. Accordingly, in this embodiment, there is no need to use a laser tube having a high directivity as the light source, and a usual light source means can be used, in other words, the white light is essential to the color separation operation for a color picture can be utilized, which is very much convenient.

In this embodiment, of course, the light beam may be separated into a plurality of light beams by means of half mirrors, and one of the separated light beams may be passed through an aperture in order to obtain the sharp signal or the unsharp signal in a conventional manner.

Figure 5:
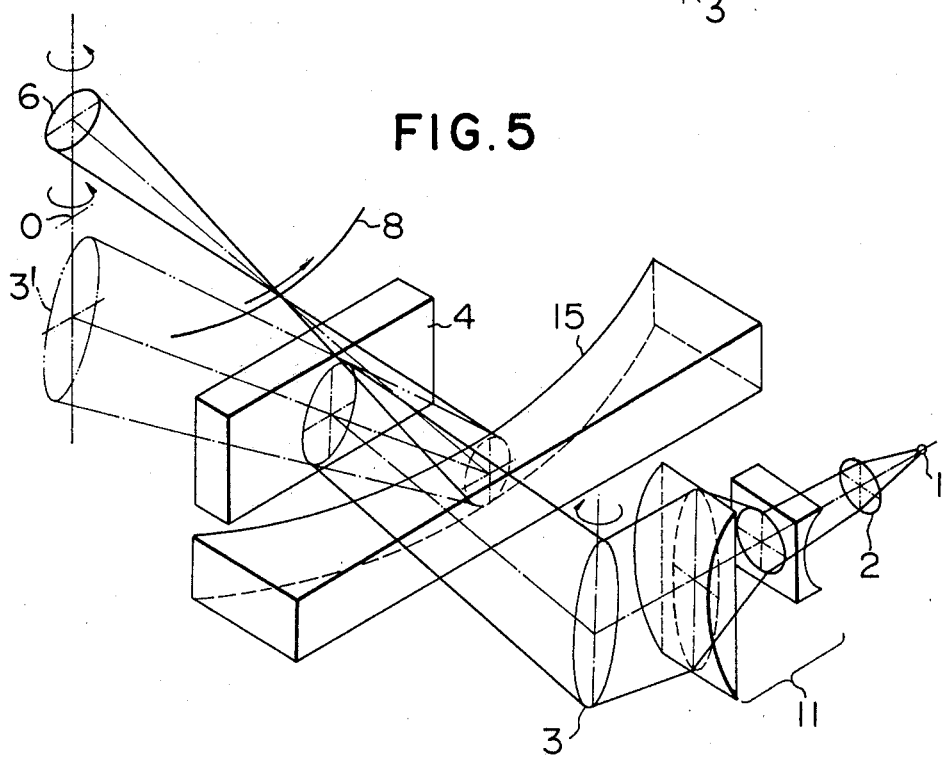
FIG. 5 is a perspective view of further embodiment of a method according to the present invention, wherein a cylindrical concave mirror is used.
Figure 6:
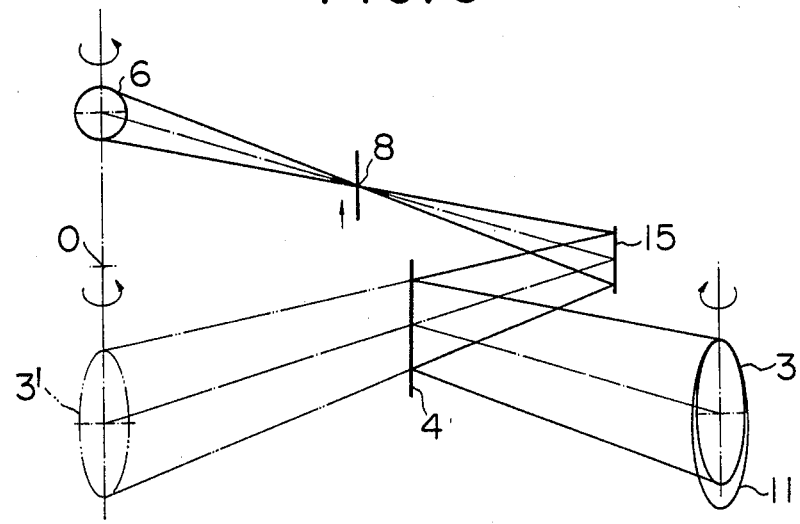
FIG. 6 is an elevational view of the essential part of the system shown in FIG. 5.

In FIGS. 5 and 6 there is shown further embodiment of the present invention, which is the same as the embodiment shown in FIGS. 3 and 4, except that a cylindrical concave mirror 15 is used instead of the spherical concave mirror 5, and that a set of cylindrical lenses 11 are arranged between the collimator 2 and the illumination deflector mirror 3.

In this embodiment, the cylindrical concave mirror 15 cannot converte the light beam in the vertical direction, and hence in order to compensate this the cylindrical lenses 11 are employed so that the light beam may be focused on the original picture 8 in the vertical direction.

In the embodiments described above, the light beam is incident at an inclined angle (no right angle) to the original picture 8.

Figure 7:
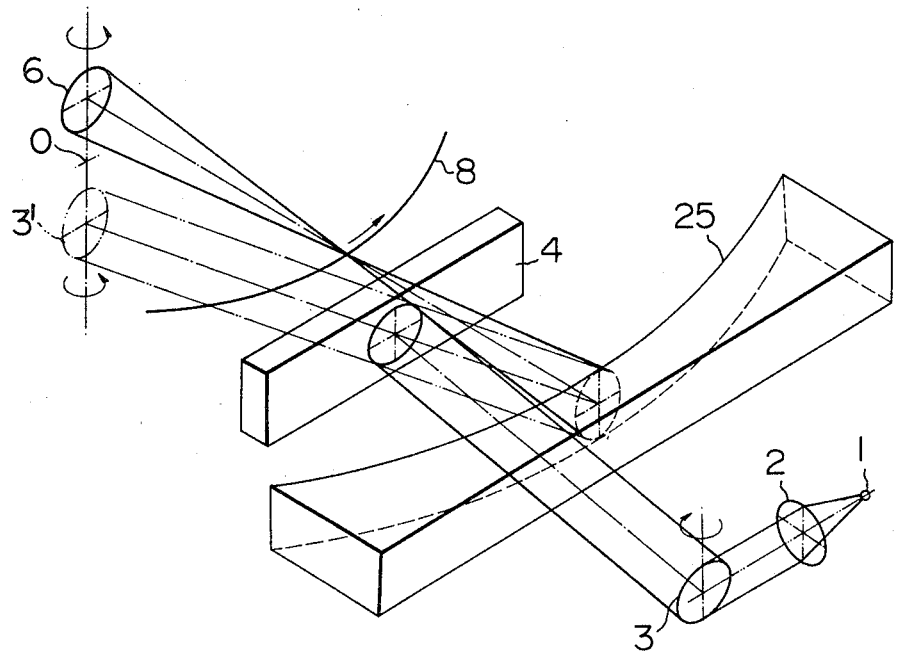
FIG. 7 is a perspective view of another embodiment of a method according to the present invention, wherein a spherical concave mirror is used.
Figure 8:
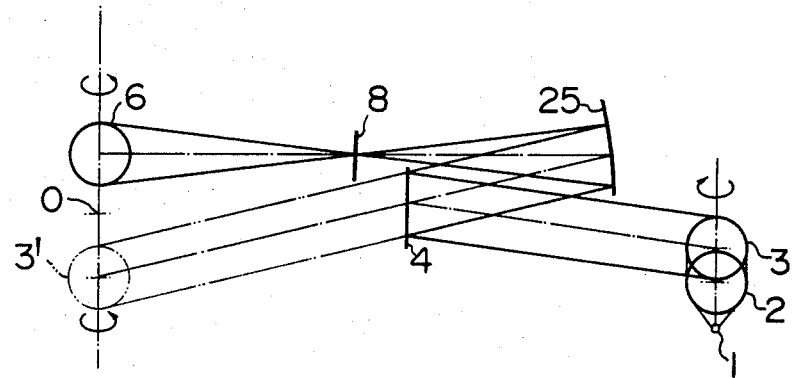
FIG. 8 is an elevational view of the essential part of the system shown in FIG. 7.

In FIGS. 7 and 8 there is shown still another embodiment of the present invention, which is the same as the embodiment shown in FIGS. 3 and 4, except that the spherical concave mirror 25 and the pickup deflector mirror 6 are arranged in the same height so that the light beam reflected by the spherical mirror 25 may be incident at a right angle to the original picture 8 and so that the picup deflector mirror 6 may be positioned in an upper symmetrical position of the virtual image position 3' of the illumination deflector mirror 3 with respect to the planar mirror 4, with respect to the center 0 of the spherical mirror 25.

In the embodiments described above the light beam is focused at the point which is positioned at the distance r/2 of the diameter r of the spherical or the cylindrical mirror 5, 15 or 25 and at which the original picture 8 is arranged. Therefore, when a rotary polygonal mirror is used as a light deflector mirror, the maximum deflection angle or the length of the horizontal spherical curve which the light spot focused moves along, depends on the divisional angle number of the polygonal mirror.

There are many original pictures of different sizes. In practice, generally, the smaller size of the original picture, the larger enlargement it is necessary. Accordingly, when an original picture of small size is processed, in order to maintain the clearness of a reproduction picture, more detailed data rather than those of the original size should be required. On the other hand, considering the processing capacity, it is desirable to diminish the size of the pickup picture element and thus the speed of the scanning of the original picture is reduced so that the processing speed of the small picture may be the same as usual. In order to realize this method to the present invention, for example, a convex or concave lens is arranged in the path of the light beam before the illumination deflector mirror 3, or the position of the collimator 2 is moved, so as to change the distance of the light spot focused by the spherical mirror 5 and therefore the position of the original picture 8.

Figure 9:
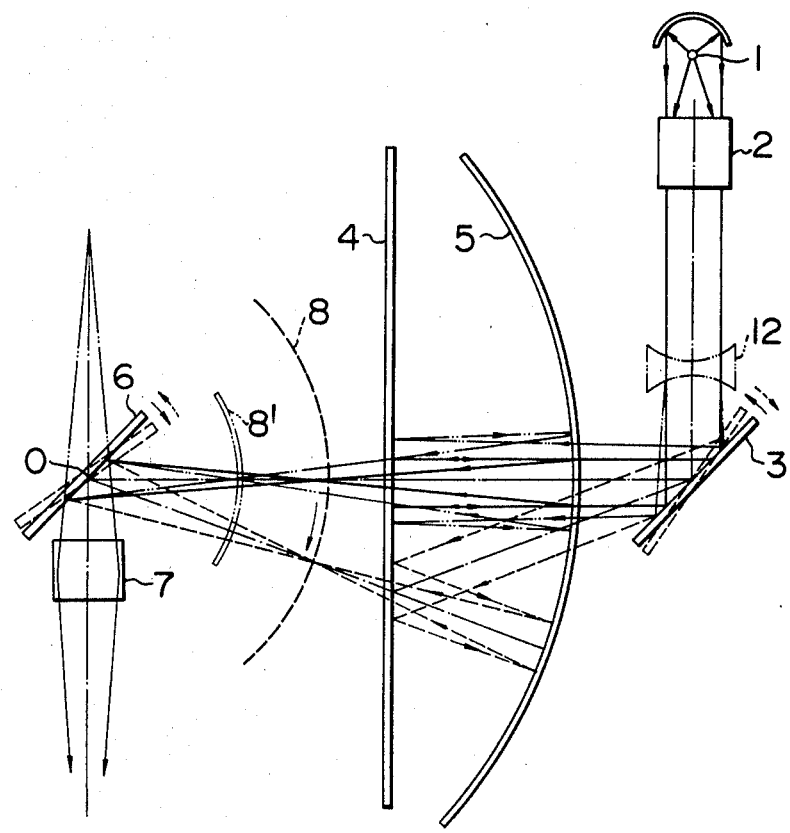
FIG. 9 is a top plan view of still another embodiment of a method according to the present invention, wherein a concave lens is arranged between a light source and an illumination deflector mirror in order to lengthen a focal distance of a light spot.

In FIG. 9 is shown still further embodiment of the present invention in which such a method is applied, which is the same as the embodiment shown in FIGS. 3 and 4, except that a concave lens 12 is placed in the path of the light beam before the illumination deflector mirror 3 in order to lengthen the focusing distance of the light beam, i.e. to shorten the distance the light spot is focused, from the position the original picture 8 is placed, i.e. the distance r/2 away from the center 0 of the spherical mirror 5, as shown by a broken line, to a position an original picture 8' is arranged in, as shown by two-dotted lines. In this embodiment, when the illumination deflector mirror 3 is pivoted at the same angle as mentioned above, the moving distance of the light spot along the original picture 8' is shortened, and thus the positions of the pickup lens 7 and the aperture mirror 9 should be changed or the opening size of the aperture 10 is reduced, thereby diminishing the size of the pickup picture element.

In the embodiment shown and described above, a galvanometric mirror or a rotary polygonal mirror may be used for the illumination deflector mirror 3 and the pickup deflector mirror 6.

Although the present invention has been shown and described in terms of preferred embodiments illustrated in the accompanying drawings, however, various changes and modifications thereof can be made by those skilled in the art without departing from the scope of the present invention.

What is claimed is:

1. A method for scanning an original picture by a light beam at a high speed for use in a picture reproducing machine, comprising the steps of:
    (a) deflecting a light beam which is generated by a light source, by a light deflector which is pivotally oscillated, the deflected light passing by a concave mirror;
    (a 1) reflecting the light beam back to said concave mirror;
    (b) focusing the deflected light beam by a concave mirror;
    (c) scanning an original picture by a light spot obtained by focusing the light beam by the concave mirror, while the light deflector is oscillated, the original picture being arranged in a curved plane including a curve along which the light spot is focused; and
    (d) detecting the light beam passing through the original picture by a light detector to obtain a picture signal.

2. A method as defined in claim 1, wherein said reflecting is accomplished by reflecting said light beam by a planar mirror disposed on a side of said concave mirror opposite said light source.

3. A method as defined in claim 2, wherein the diameter center of the concave mirror and the virtual image of the light deflector with respect to the planar mirror are aligned along a line.

4. A method as defined in claim 3, wherein the light detector is aligned on the line.

5. A method as defined in claim 1, wherein the concave mirror is a spherical mirror.

6. A method as defined in claim 5, wherein a lens is arranged in the path of the light beam before the light deflector so as to change the focusing distance of the light beam.

7. A method for scanning an original picture by a light beam at a high speed for use in a picture reproducing machine, comprising the steps of;
    (a) deflecting a light beam which is generated by a light source, by a light deflector which is pivotally oscillated;
    (b) focusing the deflected light beam by a concave mirror;
    (c) scanning an original picture by a light spot obtained by focusing the light beam by the concave mirror, while the light deflector is oscillated, the original picture being arranged in a curved plane including a curve along which the light spot is focused;
    (d) detecting the light beam passing through the original picture by a light detector to obtain a picture signal; and wherein the light beam passing through the original picture is deflected by a pickup deflector which is pivotally oscillated in synchronization with the light deflector, wherein the light beam deflected by the pickup deflector is converged by a pickup lens, and wherein the light beam converged is detected by the light detector to obtain the picture signal.

8. A method as defined in claim 2, wherein said reflecting is accomplished by reflecting said light beam by a planar mirror disposed on a side of said concave mirror opposite said light source.

9. A method as defined in claim 8, wherein the diameter center of the concave mirror and the virtual image of the light deflector with respect to the planar mirror are aligned along a line.

10. A method as defined in claim 9, wherein the pickup deflector is aligned on the line.

11. A method for scanning an original picture by a light beam at a high speed for use in a picture reproducing machine, comprising the steps of:
    (a) deflecting a light beam which is generated by a light source, by a light deflector which is pivotally oscillated, the deflected light passing by a concave mirror;
    (a 1) reflecting the light beam back to said concave mirror;
    (b) focusing the deflected light beam by a concave mirror;
    (c) scanning an original picture by a light spot obtained by focusing the light beam by the concave mirror, while the light deflector is oscillated, the original picture being arranged in a curved plane including a curve along which the light spot is focused; and (d) detecting the light beam passing through the original picture by a light detector to obtain a picture signal; and wherein the concave mirror is a cylindrical mirror and a cylindrical lens, which focuses the light beam to the original picture in a direction perpendicular to the focusing direction of the cylindrical mirror, is arranged in the path of the light beam before the light deflector.

12. A method as defined in claim 11, wherein a lens is arranged in the path of the light beam before the light deflector so as to change the focusing distance of the light beam.

13. A method as defined in claim 6 or 12, wherein the lens comprises a concave lens.

14. A method as defined in claim 6 or 12, wherein the lens comprises a convex lens.

* * * * *